Dec. 7, 1926.                                                1,609,513
O. JEZBERA
SEARCHLIGHT SUPPORTING OR SUSPENSION DEVICE
Filed April 20, 1925        2 Sheets-Sheet 1
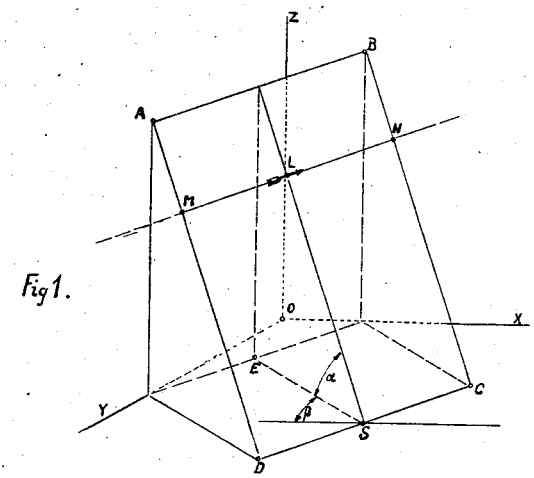
Fig 1.
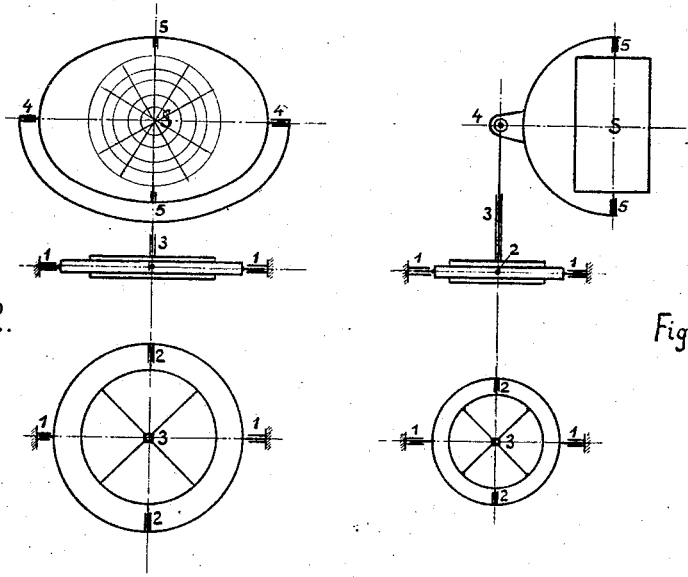
Fig 2.                                                  Fig 3.
Inventor
O. Jezbera
By
Attorneys Dec. 7, 1926.

O. JEZBERA 1,609,513

SEARCHLIGHT SUPPORTING OR SUSPENSION DEVICE

Filed April 20, 1925  2 Sheets-Sheet 2

Inventor
O. Jezbera

By Langner, Parry, Card & Langner
Attorneys.

Patented Dec. 7, 1926.

1,609,513

UNITED STATES PATENT OFFICE.

OLDŘICH JEZBERA, OF PRAGUE-VINOHRADY, CZECHOSLOVAKIA, ASSIGNOR TO ČESKO-MORAVSKÁ-KOLBEN AKCIOVÁ SPOLEČNOST, OF PRAGUE-VYSOCANY, CZECHOSLOVAKIA, A JOINT STOCK COMPANY.

SEARCHLIGHT SUPPORTING OR SUSPENSION DEVICE.

Application filed April 20, 1925, Serial No. 24,535, and in Czechoslovakia April 30, 1924.

This invention relates to searchlight supporting or suspension devices and particularly to devices for searchlights used in defence against aircraft.

The main object of the present invention is to provide an improved supporting or suspension device for causing an aircraft flying in darkness to be easily and quickly caught in the beam of the searchlight.

With the above object in view the supporting or suspension device in accordance with the present invention is constructed with freedom of adjustment around a plurality of axes related to each other in a particular manner as hereinafter more fully described. More particularly stated the device comprises parts angularly adjustable about five axes certain of which are at right angles to others.

Several embodiments of the invention are illustrated in the accompanying drawings in which:—

Figure 1 is a schematic representation or diagram illustrating the principle on which the present invention is founded.

Figure 2 is a combined elevation and part plan of one embodiment of the 5-axis suspension device.

Figure 3 is a combined elevation and part plan of a modified embodiment.

Referring first to Figure 1 it is to be observed that during the flight of an aircraft L in the straight line M—N the direction of flight determines with the position S of the searchlight a plane ABCD. The relative situation of this plane to the position of the searchlight is given by the horizontal angle $\beta$ and by the vertical angle $\alpha$, having regard to the main directions or axes in space OX, OY and OZ. The direction of flight can be ascertained by means of an apparatus which registers the angles $\alpha$ and $\beta$ by recording sound waves and magnetic waves.

If the axis of rotation of the searchlight is brought into a position perpendicular to the plane ABCD, then the beam of the searchlight can be maintained on the aircraft no matter what is its height, speed or distance from the searchlight. In order to obtain the perpendicular position of the axis of rotation relatively to the plane ABCD, four additional axes of angular movement are provided and so disposed that two adjacent axes are always situated perpendicularly with respect to each other. These four axes form in conjunction with the axis of tilt of the searchlight a 5-axis suspension or supporting device in conformity with the present invention.

The disposition of the individual axes relatively to each other and the shape or form of their embodiment in the device can be made to suit requirements. In the embodiment shown by way of example in Figure 2 there are two simple Cardan joints or mountings with crossed axes 1—1, 2—2 and 4—4, 5—5, connected through a common connecting axis 3. The axis 1—1 corresponds to the line C—D of the plane ABCD of Figure 1. The axis 2—2 corresponds to the line S—E at right angles to C—D. The position of axis 3 is determined by the horizontal angle $\beta$ and that of the axis 4—4 by the vertical angle $\alpha$. 5—5 is the axis of tilt of the actual searchlight.

The device according to the modification illustrated in Figure 3 comprises a Cardan joint 1—1, 2—2 connected with a 3-axis arrangement having the axes 3, 4, 5—5, located below said joint.

Figure 4:
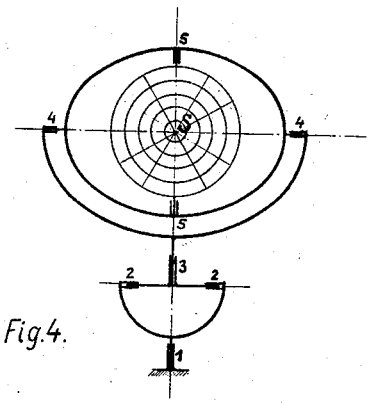
Figure 4 is an elevation of a further modification.

In Figure 4 a 3-axis arrangement having the axes 1, 2—2, 3, is disposed above a Cardan joint having the axes 4—4, 5—5.

Figures 5, 6:
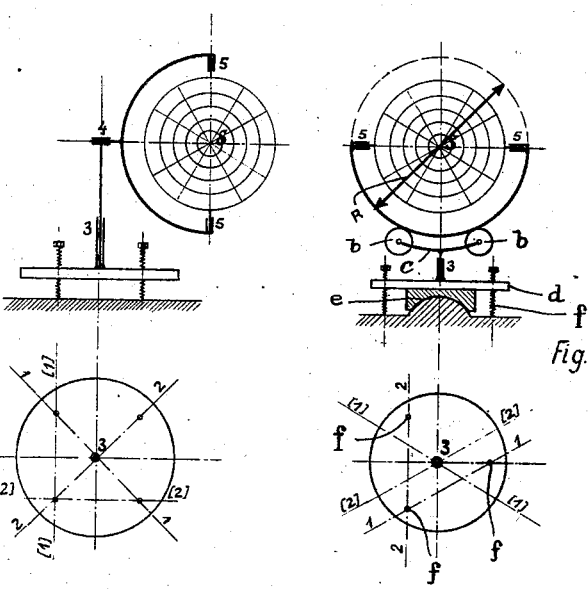
Figures 5 and 6 are combined elevations and part plans of two still further modifications.

In Figure 5 a modification is shown, comprising a 3-axis arrangment having axes 3, 4, 5—5 mounted upon a tiltable platform capable of being rocked by means of screws or other suitable mechanism around optional axes, for instance 1—1 and 2—2 or 1—2 and (2)—(2).

Figure 6 illustrates a still further modification of the searchlight suspension device or mounting. According to this modification freedom of movement about an axis corresponding to the axis 4 of Figure 5 is obtained by means of an arcuate track of diameter are adapted for movement upon rollers $b$ mounted in a carriage $c$. The carriage $c$ is itself mounted for rotation about an axis 3 and the whole apparatus is mounted upon a tiltable platform $d$ which may be set in position by means of the hemispherical bearing $e$ and the three screws $f$ or merely by the three screws $f$.

What I claim and desire to secure by Letters Patent is:—

1. A suspension device or mounting for aircraft defense searchlights comprising a five-axis assembly of elements certain of which form a three-axis assembly and the remainder consists of a platform rockably mounted about two optionally selectable axes, in combination with a hemispherical bearing for said platform.

2. A suspension device or mounting for aircraft defence searchlights, comprising a five-axis assembly of angularly adjustable elements certain of which form a three-axis assembly and the remainder contains the remaining two axes, the mounting for freedom of angular movement about one axis of the three-axis assembly comprising an arcuate track on which certain elements of the assembly can be rocked.

In testimony whereof I have signed my name to this specification.

OLDŘICH JEZBERA.